United States Patent [19]
Wichmann

[11] Patent Number: 5,030,870
[45] Date of Patent: Jul. 9, 1991

[54] CONDUCTOR WINDING DEVICE FOR A LARGE ELECTRIC MACHINE

[75] Inventor: Arnold Wichmann, Mülheim, Fed. Rep. of Germany

[73] Assignee: Siemens Aktiengesellschaft, Munich, Fed. Rep. of Germany

[21] Appl. No.: 550,684

[22] Filed: Jul. 10, 1990

[30] Foreign Application Priority Data

Jul. 10, 1989 [DE] Fed. Rep. of Germany . PCT/DE89/00456

[51] Int. Cl.$^5$ .............................................. H02K 3/48
[52] U.S. Cl. .................................... 310/215; 310/45; 310/179; 310/214; 335/297
[58] Field of Search ................. 310/215, 45, 208, 198, 310/179, 180, 184, 214; 335/281, 282, 297, 299; 336/96, 197

[56] References Cited

U.S. PATENT DOCUMENTS

| | | | |
|---|---|---|---|
| 2,705,292 | 3/1955 | Wagenseil | 310/196 |
| 3,508,096 | 4/1970 | Kull et al. | 310/196 |
| 3,860,744 | 1/1975 | Schuler | 310/208 |
| 3,990,029 | 11/1976 | Kano et al. | 335/297 |
| 4,091,139 | 5/1978 | Quirk | 428/244 |
| 4,369,389 | 1/1983 | Lambrecht | 310/214 |
| 4,403,163 | 9/1983 | Armerding et al. | 310/45 |

FOREIGN PATENT DOCUMENTS 3016990 11/1981 Fed. Rep. of Germany .
3102849 6/1988 Fed. Rep. of Germany .

OTHER PUBLICATIONS

Patent Abstracts of Japan, vol. 4, No. 130 (E-25) (612) Sep. 12, 1980, & JP-A-55 83434 (Meidensha), Jun. 23, 1980.
Patent Abstracts of Japan, vol. 4, No. 157 (E-32) (639) Nov. 4, 1980, & JP-A-55 106046 (Hitachi), Aug. 14, 1980.
Patent Abstracts of Japan, vol. 7, No. 200 (E-196) (1345) Sep. 3, 1983, & JP-A-58 99238 (Hitachi), Jun. 13, 1983.
Patent Abstracts of Japan, vol. 2, No. 19 (E-77) (11251) Feb. 8, 1978, & JP-A-52 138,601 (Mitsubishi), Nov. 18, 1977.

Primary Examiner—Steven L. Stephan
Assistant Examiner—Edward H. To
Attorney, Agent, or Firm—Herbert L. Lerner; Laurence A. Greenberg

[57] ABSTRACT

A filler-impregnatable device for a large electric machine, such as a stator or a rotor, includes a carrier body having slots formed therein defining slot walls. Conductor windings have conductor devices disposed in the slots associated therewith. Impregnatable insulating layers each surround a respective one of the conductor devices. Impregnatable first semiconductor layers each envelope a respective one of the insulating layers. At least one impregnatable second semiconductor layer is disposed between the first semiconductor layer of each respective conductor device and at least one of the slot walls of the associated slot. The at least one second semiconductor layer is electrically connected to the first semiconductor layer of each respective conductor device. Filler-permeable separating layers are each disposed between the first semiconductor layer and the at least one second semiconductor layer of each respective conductor device. The separating layers reduce but do not prevent adhesion of the first semiconductor layers to the second semiconductor layers to be provided by a filler.

23 Claims, 2 Drawing Sheets

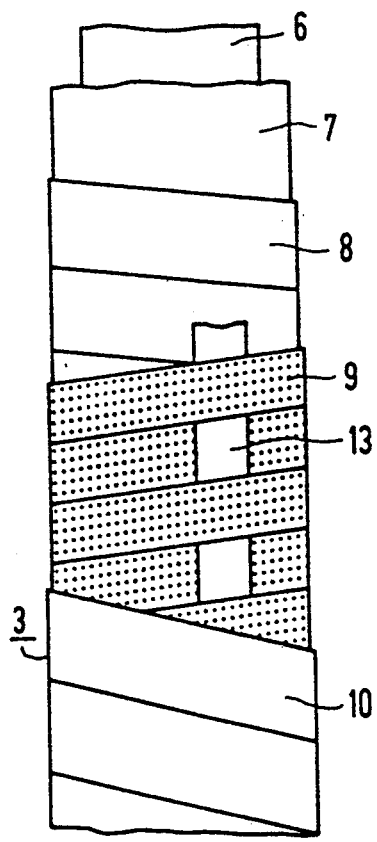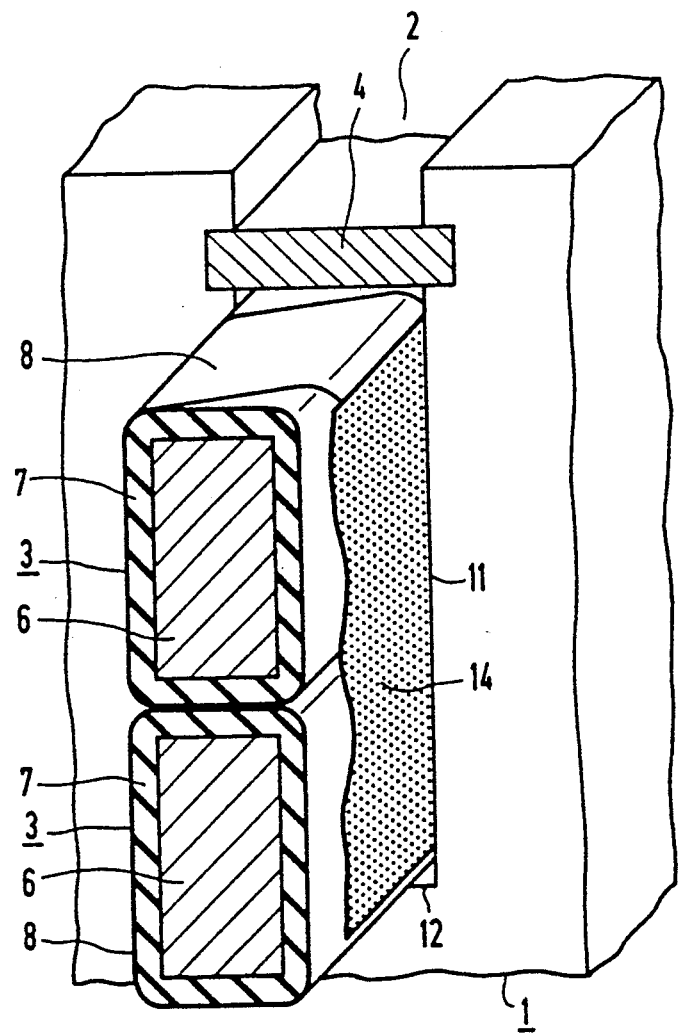
FIG 2
FIG 3

CONDUCTOR WINDING DEVICE FOR A LARGE ELECTRIC MACHINE

The invention relates to a conductor winding device for a large electric machine having an electrical power consumption or output of more than about 20 MVA, preferably more than about 50 MVA, especially a turbogenerator, in which some of the conductor windings include conductor devices laid in slots.

In the prior art, the construction of a conductor winding for a large electric machine is effected in such a way that winding bars are laid in slots that are machined into a carrier body; then the slots are closed by suitable means, and the various winding bars are electrically connected together to form the conductor windings.

A more detailed description of the structure of typical winding bars is found, for instance, in German Patent DE-PS 31 02 849 C2. In that device, a winding bar includes an electrically conductive conductor bar, which as a rule is made of copper, or a plurality of such conductor bars, all or some of which may be hollow in order to carry coolant, and an insulating layer surrounding the conductor device including the conductor bar or bars. The insulating layer as a rule is produced by wrapping the conductor device with an impregnatable strip containing a solid insulator such as mica, impregnating the wrapper with a curable liquid filler such as artificial resin, and finally curing the filler. Since the impregnated insulating material has no dimensional stability at all before curing, the curing must be performed in a squeeze mold, into which the winding bar must be placed.

During the operation of a large electric machine, the windings are subjected to considerable forces. In the case of stationary windings, the forces are primarily magnetically dictated forces, while in the case of rotating windings, centrifugal forces are additionally significant. Options for securing the windings in the slots are presented, for instance, in German Published, Non-Prosecuted Application DE-OS 3 016 990. In addition to slot closure means that are capable of withstanding sufficient loads, resilient elements are introduced into the slots, in order to fix the windings without play.

A particularly economical method developed in the last few years for producing the insulations of the conductor devices for large electrical machines, which had already been known in a similar form in the manufacture of small transformers and the like, is known as the total impregnation method. In the total impregnation method, the carrier body and conductor windings are first mounted in their entirety, without being impregnated with filler beforehand. In particular, the conductor devices are installed with unimpregnated jackets of insulating material, and then are impregnated as a complete entity. Since the conductor devices only receive their filler impregnation in the completely installed state, the major expense of producing winding bars that have dimensionally accurate insulations before installation, can be dispensed with.

Despite the considerable expense of the total impregnation process, which among other things requires a container measuring several meters in size for holding the impregnation bath for the devices to be impregnated, it also has many advantages: As long as the filler has sufficiently low viscosity, it can fill every gap remaining in the device during the impregnation, and thus can make the device into a single compact solid body once curing has taken place. As a result, excellent electrical properties, and particularly high quality of the dielectrics can be assured. Moreover, the cured filler can contribute to the fixation of the windings in the slots, so that under some circumstances the demands made on the slot closing means can be reduced considerably. It is also sometimes possible to dispense with additional spring elements for fixation of the position of the conductor devices, so that for given requirements in terms of electrical power capacity, smaller structures are possible in comparison with conventional machines.

In order to provide the impregnation, a filler and in particular an artificial resin that cures at a temperature markedly above the operating temperature of the device, is typically used. The operating temperature, particularly in a water-cooled large electric machine, is on the order of 100° C., so that as a rule a filler that has a curing temperature in the range from approximately 100° C. to approximately 200° C., and preferably approximately 150° C., is used. In order to provide curing, the impregnated device should be heated accordingly to a temperature that is equivalent to or slightly above the curing temperature. Heating to a temperature of typically approximately 150° C. can sometimes cause notable thermally dictated changes in the shape of the carrier body, which can become problematic especially upon cooling, after curing of the impregnation has been completed: During cooling, a certain shrinkage occurs, and tensile strains arise in the carrier body. Depending on the brittleness of the cured filler, such tensile strains can cause fissures to form. On one hand, such fissures can impair strength in an objectionable manner. On the other hand, corona discharges can arise in the fissures, which not only impair the quality of the dielectric but can cause damage to the insulation over the course of time.

It is accordingly an object of the invention to provide a conductor winding device for a large electric machine, which overcomes the hereinafore-mentioned disadvantages of the heretofore-known devices of this general type and in which the uncontrolled formation of fissures is precluded, thereby averting the occurrence of corona discharges along with the resultant impairments.

With the foregoing and other objects in view there is provided, in accordance with the invention, a filler-impregnatable device for a large electric machine, comprising a carrier body having slots formed therein defining slot walls; conductor windings having conductor devices disposed in the slots associated therewith; impregnatable insulating layers each surrounding respective one of the conductor devices, impregnatable first semiconductor layers each enveloping a respective one of the insulating layers; at least one impregnatable second semiconductor layer disposed between the first semiconductor layer of each respective conductor device and at least one of the slot walls of the associated slot, the at least one second semiconductor layer being electrically connected to the first semiconductor layer of each respective conductor device; and filler-permeable separating layers each being disposed between the first semiconductor layer and the at least one second semiconductor layer of each respective conductor device, the separating layers reducing but not preventing adhesion of the first semiconductor layers to the second semiconductor layers to be provided by filler.

According to the present invention, the fissuring dictated by thermal processes of expansion and contraction in the cured filler is concentrated in predetermined zones, and it is assured that in these zones, excessive electrical field intensities that trip corona discharges cannot occur. These zones are defined by the regions in the slots of the carrier body that contain the conductor devices in which the cured filler comes into contact with the separating layer. Since the filler adheres to the substance of the separating layer only slightly if at all, a gap can form at each point of contact without requiring damage to material. Since the zone of contact between the filler and the separating layer is located between two electrically semiconducting layers that are electrically connected to one another, it represents a region in which a largely constant electrical potential is present. Accordingly, corona discharges cannot occur there, so that impairment of the dielectric qualities of the filler from fissures is largely precluded. Although the introduction of a separating layer into the slot does create a zone that is not as strong as other zones in the slot, it is nevertheless readily possible to take this intentional weak point into account, while using suitable, conventional fixation procedures.

Through the use of the separating layer according to the invention, the adhesion of the first semiconductor layer to the at least one second semiconductor layer, that is dictated by the filler upon impregnation, is not precluded completely. Instead, contact points remain between the semiconductor layers, which are distributed over as wide an area as possible. At these contact points, the semiconductor layers can enter into electrical connection with one another, thereby obviating otherwise necessary devices for assuring this contact. An electrical connection of the first semiconductor layer with the at least one second semiconductor layer through the separating layer also assures an optimal equalization of potential in the zone of contact of the separating layer and the filler, because the electrical connection of the layers can be kept optimally short and no longer needs to extend over more or less large loops.

The fact that adhesion of the semiconductor layers to one another is not completely precluded also assures a certain residual strength of the zone of contact of the separating layer and the filler, which provides overall reinforcement of the strength of the device and is desirable especially in devices that must withstand very heavy loads during operation.

An essential component of the separating layer is a separating agent that is not moistened by the filler. In the case where a synthetic resin is used as the filler, it is possible, for instance, to use an oily or fat-like substance such as polytetrafluoroethylene, a silicon composition or the like as the separating agent.

In accordance with another feature of the invention, each of the separating layers is a textile being impregnated with a separating agent preventing moistening with the filler.

In accordance with a further feature of the invention, each of the separating layers is a permeable film having a separating agent preventing moistening with the filler.

It is advantageous to apply such a separating agent to a suitable substrate, for instance to impregnate a textile with the separating agent, or to use a film, that is perforated over the surface thereof, as a component of the separating agent. Films that are made of non-wettable or non-moistenable substances, such as polytetrafluoroethylene or the like, that are optionally made electrically semiconducting by suitable additives and/or are provided with openings for the filler, can also be used.

In accordance with an added feature of the invention, each of the first semiconductor layers is a strip of semiconducting textile wound onto a respective one of the insulating layers. This structure is used particularly to enable manufacture of the device according to the invention by time-tested processes. The strip is in particular a woven or non-woven fabric made of plastic, to which conductive pigments are added. The material of the semiconductor layer is thus similar to the material of the insulating layer, which as a rule is provided by a wrapper having a strip containing insulating material, and the material of the semiconductor layer can be processed in the same way as the insulating layer is applied. This makes for cost-effective manufacture.

In accordance with an additional feature of the invention, the at least one second semiconductor layer of each conductor device has a strip of a semiconducting textile wound around the conductor device. The same purpose is served if the second semiconductor layer is also a strip of semiconducting textile or the like wound onto the winding bar.

In accordance with yet another feature of the invention, each of the separating layers electrically connects a respective one of the first semiconductor layers to the at least one associated second semiconductor layer. Under some circumstances, a separating layer that is also semiconducting can also be used. A separating agent that is provided with semiconducting pigments can in particular be used as a semiconducting separating layer. A semiconducting textile that is impregnated with a separating agent, or a semiconducting foil, could be used as well.

In accordance with yet a further feature of the invention, each of the separating layers is united with material of a respective one of the first semiconductor layers.

In accordance with yet an added feature of the invention, each of the separating layers is a coating of a respective one of the first semiconductor layers with a separating agent.

In accordance with yet an additional feature of the invention, each of the separating layers is united with material of a respective one of the second semiconductor layers.

In accordance with again another feature of the invention, each of the separating layers is a coating of a respective one of the second semiconductor layers with a separating agent.

In this way, the introduction of the separating layer into the device can be performed simultaneously with the corresponding semiconductor layer, thus substantially simplifying the manufacturing process.

In accordance with again a further feature of the invention, the separating layer of each of the conductor devices is a strip applied to a respective one of the first semiconductor layers, and the strips include a separating agent preventing moistening with the filler.

In accordance with again an added feature of the invention, the strips are wound onto the first semiconductor layers. This makes it possible to introduce the separating layer by conventional methods.

In accordance with again an additional feature of the invention, there is provided at least one contact conductor in the form of an electrically conductive bar being applied onto the first semiconductor layer with the separating layer and being electrically connected to both the first semiconductor layer and the at least one second semiconductor layer for each conductor device. This provides particularly good electrical connection of the first semiconductor layer to the second semiconductor layer.

In this connection it is particularly advantageous to fix the at least one contact conductor along with the strip forming the separating layer on the first semiconductor layer of the conductor device in such a way that the strip is passed over the bar and under the bar in alternation, when the first semiconductor layer is wrapped. This embodiment also permits an electrical connection of the first semiconductor layer to the second semiconductor layer in such a way as to avoid large loops. The constancy of the electrical potential in the zone of contact of the separating layer and the filler between the semiconductor layers is thus assured in a particular manner, and a device which is particularly suitable for the object of the invention is attained.

In accordance with still another feature of the invention, the at least one second semiconductor layer is provided for each slot by means of a liner of semiconducting material, covering at least one slot wall.

Within the scope of this version it is unnecessary to provide each conductor device with its own second semiconductor layer. The result is that markedly less space is required, so that for a given loading capacity, particularly compact devices can be attained, or these devices can be optimized for other considerations, for instance with a view to the function of the large electric machines for which they are intended.

In accordance with still a further feature of the invention, the slot liner is a semiconducting textile.

In accordance with still an added feature of the invention, the slot liner and the separating layer are disposed on only one of the slot walls in each of the slots.

The slot liner can be provided with the separating layer, for instance in the form of a coating or in the form of an additional liner that is applied onto the aforementioned slot liner with a semiconducting textile. As mentioned above, it is not absolutely necessary to provide the slot liner with a separating layer on both walls of one slot. The advantages according to the invention are gained even if the slot liner is provided with a separating layer on only a single slot wall. The firm adhesion of the conductor winding device to the slot wall that has no separating layer thus additionally contributes to increasing the strength of the device.

With the objects of the invention in view, there is also provided a device, impregnated with a filler and in particular a cured artificial resin, in the form of a carrier body with conductor windings for a large electric machine, in which some of the conductor windings include conductor devices laid in slots of the carrier body, and each slot of the carrier body has at least one electrically shielded zone, the strength of which is reduced in comparison with other zones in the slot. Fissures in the filler that are caused, for instance, by thermal expansion and contraction preferentially occur in the aforementioned zone of reduced strength. Since no significant electrical potential drops occur in this zone, spark formation in the fissures is practically precluded, and an impairment of the electrical quality of the device is precluded. Moreover, the zone that tends to fissuring is well defined, so that despite the fissuring, an impairment of the mechanical strength of the device can be avoided, optionally by the purposeful use of strength-increasing means.

The present invention furnishes devices having conductor windings that are particularly suitable as parts of large electric machines, for instance as stators, after impregnation with a filler, in particular a cured artificial resin, because they exhibit particular robustness and excellent electrical qualities, along with the possibility of attaining particularly compact forms or shapes for a given loading capacity.

Other features which are considered as characteristic for the invention are set forth in the appended claims.

Although the invention is illustrated and described herein as embodied in a conductor winding device for a large electric machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2 is a fragmentary, elevational view of a prepared embodiment of a conductor device that is particularly well suited for installation in a device according to the invention; and FIG. 3 a fragmentary, perspective view of a particularly favorably constructed device according to the invention.

Figure 1:
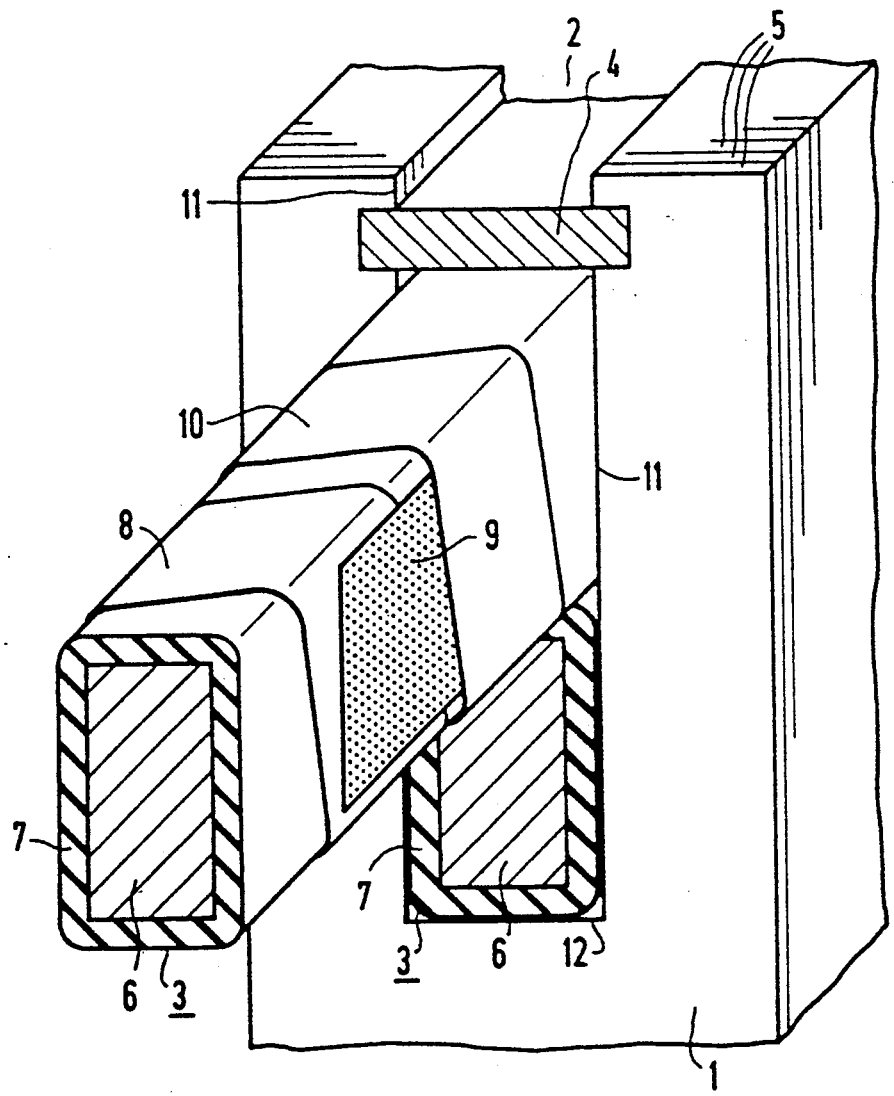
FIG. 1 is a fragmentary, diagrammatic, perspective view of a device according to the invention, which has been prepared for impregnation.

Referring now to the figures of the drawings in detail and first, particularly, to FIG. 1 thereof, there is seen a carrier body 1 having slots 2, which serve to receive winding bars 3 and are closed with suitable slot closing means 4 after the placement of the windings bars 3 therein. Many variations of slot closing means are known to one skilled in the art. The carrier body 1 can be either a one-piece block or a block assembled from only a few elements, as in the case of a rotor, or it may be formed of a great number of individual metal sheets 5 as is preferred, for instance, for stators. Mixed forms are of course also possible, and this is up to the decision of one skilled in the art.

A winding bar 3 includes an essential component which is a conductor device 6 that is surrounded by an insulating layer 7. The conductor device 6 includes at least one electrically conducting bar, in particular a copper bar, and depending on the intended operating load can have conduits in it for carrying coolant or the like. The insulating layer 7 as a rule includes a wrapping with a strip that has an insulating material such as mica and can be impregnated with a filler such as artificial resin. Once the impregnation with filler has been completed, the insulating layer 7 is an essentially compact, homogeneous solid body, in which the filamentary structures of the strip, along with the insulating material, are embedded.

In the sense of the present invention, the insulating layer 7 of the winding bar 3 is surrounded by a first semiconductor layer 8. Separating layers 9 of a material that is moistened only slightly if at all by the filler with which the device is to be impregnated, are applied on the first semiconductor layer 8, at least at the sides of the winding bar 3 that are oriented toward slot walls 11 of the carrier body 1. The separating layers 9 are fixed on the winding bar 3 with a second semiconductor layer 10, which is applied over the separating layers 9 and the first semiconductor layer 8.

Once the conductor device including the carrier body 1, the winding bars 3 and the slot closing means 4 has been completely mounted, it is impregnated as a whole with a curable artificial resin or a similar filler, and the filler is cured. In order to provide curing, suitable chemicals are usually admixed with the actual filler, and in order to trigger the curing process, heating of the filler to a predetermined temperature, which is on the order of approximately 150° C. with typical artificial resins, is necessary. Once curing has taken place, the device is cooled again. Thermal shrinkage results in tensile strains within the device, particularly inside the slots 2, and these strains can possibly lead to fissuring.

An essential element of the present invention is that the resultant fissures are concentrated in predetermined zones in each slot of the carrier body 1, and care is also taken to assure that excessive electrical field intensities that trip corona discharges cannot occur in these zones. The zones are defined by the regions in the slot 2 in which the cured filler comes into contact with the separating layer 9. Since the filler adheres to the separating layer 9 only slightly if at all, a gap can form at each point of contact without requiring that material be damaged. Since the separating layer 9 is enclosed between two electrically conducting, interconnected layers formed of the first semiconductor layer 8 and the second semiconductor layer 10, the separating layer 9 and thus the zone of contact between the filler and the separating layer 9 are located in a potential-free region. Electric fields and thus corona discharges cannot occur in this region, so that excellent electrical quality is assured. Although the introduction of a separating layer 9 into the slot 2 does produce a point that is weaker in strength than other regions in the slot 2, it is nevertheless no problem to take this intentional weak point into account: Any available means that can fix winding bars 3 in slots 2 of carrier bodies 1 that do not undergo any filler impregnation can be used. Excellent mechanical properties and in particular those with a view to a long service, life are assured.

FIG. 2 shows a particular version of a winding bar 3 of the kind that can be used within the scope of the present invention. The characteristic of this version is a separating layer 9 in the form of a strip that is wound around the first semiconductor layer 8 on the insulating layer 7 of the winding bar 3.

The conductive connection between the first semiconductor layer 8 and the second semiconductor layer 10, which in the embodiment of FIG. 1 was assured by the fact that the first semiconductor layer 8 and second semiconductor layer 10 contacted one another at certain points, is effected in the winding bar 3 of FIG. 2 by means of an additional contact conductor 13 that is made of conducting material, in particular copper. The additional contact conductor 13 is applied onto the first semiconductor layer 8 along with the separating layer 9, in such a way that it alternatingly contacts the first semiconductor layer 8 and the second semiconductor layer 10, which is wound onto the separating layer 9.

A winding bar 3 of this kind thus assures that fissures that occur from thermal strains in its entire surroundings are concentrated in a region that is protected against corona discharges and the like.

FIG. 3 shows an advantageous embodiment of the conductor winding device according to the invention. The winding bars 3 only have a first semiconductor layer 8, and instead of the separating layer 9 introduced into the outer zone of the winding bars 3, the slot walls 11 receive a slot liner 14, which like the separating layer 9 is not moistened by the filler and thus shifts the zone for the controlled fissuring into the region around the slot wall 11. The equalization of potential in the region of the slot liner 14 is effected by providing that the first semiconductor layer 8 of the winding bars 3 is brought into conductive contact with the carrier body 1. This is advantageously performed by providing that a slot bottom 12 does not receive any slot liner 14, so that the first semiconductor layer 8 enters into electrical connection with the carrier body 1 through the slot bottom 12. Should it be impossible to dispense with a slot liner 14 for the slot bottom 12, then it is beneficial to provide a slot liner 14 for the slot bottom 12 that is interrupted by a contact conductor 13 which assures the electrical connection, somewhat like that which is shown in FIG. 2.

In the exemplary embodiments, only slots 2 having two winding bars 3 have been shown. Naturally, the present invention does not merely include systems having two winding bars 3 but any systems that in the usual manner result from the examples which have been presented and merely serve for illustration.

The present invention furnishes conductor winding devices for large electric machines, which enable the exploitation of the advantages of total impregnation in a particular manner, with a view to minimizing electrical losses and increasing service life.

What is claimed is:

1. Filler-impregnatable device for a large electric machine, comprising:
   a) a carrier body having slots formed therein defining slot walls;
   b) conductor windings having conductor devices disposed in said slots associated therewith;
   c) impregnatable insulating layers each surrounding a respective one of said conductor devices, impregnatable first semiconductor layers each enveloping a respective one of said insulating layers;
   d) at least one impregnatable second semiconductor layer disposed between said first semiconductor layer of each respective conductor device and at least one of said slot walls of said associated slot, said at least one second semiconductor layer being electrically connected to said first semiconductor layer of each respective conductor device; and
   e) filler-permeable separating layers each being disposed between said first semiconductor layer and said at least one second semiconductor layer of each respective conductor device, said separating layers reducing but not preventing adhesion of said first semiconductor layers to said second semiconductor layers to be provided by filler.

2. Device according to claim 1, wherein each of said separating layers is a textile being impregnated with a separating agent preventing moistening with the filler.

3. Device according to claim 1, wherein each of said separating layers is a permeable film having a separating agent preventing moistening with the filler.

4. Device according to claim 1, wherein each of said first semiconductor layers is a strip of semiconducting textile wound onto a respective one of said insulating layers.

5. Device according to claim 1, wherein said at least one second semiconductor layer of each conductor device has a strip of a semiconducting textile wound around said conductor device.

6. Device according to claim 1, wherein each of said separating layers electrically connects a respective one of said first semiconductor layers to said at least one second semiconductor layer of each respective conductor device.

7. Device according to claim 1, wherein each of said separating layers is united with material of a respective one of said first semiconductor layers.

8. Device according to claim 7, wherein each of said separating layers is a coating of a respective one of said first semiconductor layers.

9. Device according to claim 1, wherein each of said separating layers is united with material of a respective one of said second semiconductor layers.

10. Device according to claim 9, wherein each of said separating layers is a coating of a respective one of said second semiconductor layers.

11. Device according to claim 1, wherein said separating layer of each of said conductor devices is a strip applied to a respective one of said first semiconductor layers, said strips including a separating agent preventing moistening with the filler.

12. Device according to claim 11, wherein said strips are wound onto said first semiconductor layers.

13. Device according to claim 11, including at least one contact conductor in the form of an electrically conductive bar being applied onto said first semiconductor layer with said separating layer and being electrically connected to both said first semiconductor layer and said at least one second semiconductor layer for each conductor device.

14. Device according to claim 12, including at least one contact conductor in the form of an electrically conductive bar being applied onto said first semiconductor layer with said separating layer and being electrically connected to both said first semiconductor layer and said at least one second semiconductor layer for each conductor device.

15. Device according to claim 1, wherein said at least one second semiconductor layer is a slot liner made of semiconducting material covering at least one of said slot walls.

16. Device according to claim 15, wherein said slot liner is a semiconducting textile.

17. Device according to claim 15, wherein said slot liner and said separating layer are disposed on only one of said slot walls in each of said slots.

18. Device according to claim 16, wherein said slot liner and said separating layer are disposed on only one of said slot walls in each of said slots.

19. Device according to claim 1, including an impregnated filler, each of said slots having at least one electrically shielded zone disposed substantially parallel to one of said slot walls and having other zones, said at least one electrically shielded zone having less strength than said other zones in said slots.

20. Device according to claim 19, wherein said filler is a cured artificial resin.

21. Filler-impregnatable device for a stator or a rotor of a large electric machine, comprising:
a) a carrier body having slots formed therein defining slot walls;
b) conductor windings having conductor devices disposed in said slots associated therewith;
c) impregnatable insulating layers each surrounding a respective one of said conductor devices, impregnatable first semiconductor layers each enveloping a respective one of said insulating layers;
d) at least one impregnatable second semiconductor layer disposed between said first semiconductor layer of each respective conductor device and at least one of said slot walls of said associated slot, said at least one second semiconductor layer being electrically connected to said first semiconductor layer of each respective conductor device;
e) filler-permeable separating layers each being disposed between said first semiconductor layer and said at least one second semiconductor layer of each respective conductor device; and
f) filler impregnating said separating layers, said separating layers reducing but not preventing adhesion of said first semiconductor layers to said second semiconductor layers provided by said filler.

22. Device according to claim 21, wherein said filler is a cured artificial resin.

23. Filler-impregnatable device for a large electric machine, comprising:
a) a carrier body having slots formed therein defining slot walls;
b) conductor windings having conductor devices disposed in said slots associated therewith;
c) impregnatable insulating layers each surrounding a respective one of said conductor devices, impregnatable semiconductor layers each enveloping a respective one of said insulating layers;
d) a slot liner made of semiconducting material disposed between said semiconductor layers and at least one of said slot walls of said associated slot; and
e) permeable separating layers each being disposed between a respective one of said semiconductor layers and said slot liner.

* * * * *